United States Patent Office 2,961,799
Patented Nov. 29, 1960

2,961,799
METHOD OF TREATING SOIL WITH LATEX COMPOSITIONS

Bernard Coe, Palmyra, N.J., assignor to Alco Oil & Chemical Corporation, Philadelphia, Pa., a corporation of Ohio No Drawing. Filed Aug. 18, 1959, Ser. No. 834,374

25 Claims. (Cl. 47—9)

The present invention relates to a novel method of treating soil, and, more particularly, this invention relates to a method of protecting the soil from erosion. This application is a continuation-in-part of my application Serial No. 763,188, filed September 25, 1958, now abandoned.

In many areas, soil erosion caused by wind and rain is a serious problem. For example, sandy silt which is dredged from a river bottom and dumped along the banks of the river in time undergoes considerable erosion by the action of both wind and rain. In dry weather the silt is blown about by the wind and the wind-borne dust is a nuisance to adjacent communities. During heavy rains the silt is eroded away and re-deposited in the river, and in time the re-deposited silt may become an obstruction to navigation requiring further dredging of the river.

Soil erosion is also a serious problem to agriculture. Citrus tree growers have traditionally mounded earth around the base of young trees to protect the graft bud from injury by frost during the first several years of their growth. Because of erosion of these mounds of earth, continual inspection and remounding of earth is necessary, which are both costly and time consuming. Small seeds are frequently planted under mounds of earth or soil to prevent their dislodgement by erosion caused by wind and/or rain. However, these mounds of soil frequently compact and are baked hard by the sun's rays, preventing the sprouting seeds from penetrating the surface of the soil, and many plants are lost in germination. Terraced areas, of course, are particularly susceptible to erosion.

Many expensive and time consuming efforts have been made to prevent or at least inhibit soil erosion. One method employed to prevent erosion of silt dredged from river bottoms is to distribute straw manure in an amount of about five or six tons per acre over the silt. In addition to the problem of transporting the manure to the area to be protected from erosion, the proper spreading thereof is often difficult, for the spreading equipment, even if caterpillar-type tractors, often becomes mired, requiring further equipment to free the mired equipment. Furthermore, to prevent erosion of the manure itself, resort is often made to tying down the manure by means of string fastened to pegs placed at short intervals. This type of treatment involves considerable expense for labor and equipment.

Another soil stabilization procedure comprises applying to the surface of the soil an asphalt emulsion mixed with straw. Such procedure has the disadvantage of requiring specially designed equipment and the handling of large quantities of materials having considerable bulk.

Terraced areas planted with grass seed have in the past been protected from erosion by sheets of loosely woven cloth. The cloth is secured for example by pegs driven into the soil. However, the cost and inconvenience of applying large quantities of cloth precludes large scale employment of this procedure. Furthermore, the cloth may be carried away by high winds.

It is the principal object of this invention to provide a novel method of treating soil to provide a protective coating.

Another object of this invention is to provide a novel method of treating soil to protect the soil from erosion caused by wind and rain.

A further object of this invention is to provide a novel method of treating soil to protect soil from erosion by wind and rain which is relatively simple and inexpensive and enhances the germination of seeds or growth of desired vegetation.

Other objects of this invention become apparent from a consideration of the following specification and claims.

The process of the present invention comprises forming on the surface of the soil a film of rubber by applying to the soil surface a latex composition comprising from about 0.5 to about 10 percent, by weight, of a water-insoluble rubber and from about 0.005 to about 0.5 percent of a water soluble counter-penetrant for said elastomer. The counter-penetrant is adsorbed by soil particles to render the latex composition unstable and has protective colloid action for the colloidal rubber particles of the latex composition. Counter-penetrants selected from the group consisting of natural gums, methyl cellulose having a degree of substitution of from about 1.2 to about 2, a hydroxyethyl ether of cellulose having a degree of substitution of about 1.5 to about 3, alkali metal salts of carboxy methyl cellulose having a degree of substitution of from about 0.4 to about 1.3, a polyacrylate, an 0.5 percent aqueous solution of which has a viscosity of from about 20 to about 200 cps. at 38° C., and polyacrylamides.

It has been found that the application of latex compositions of this type to the surface of soil, after evaporation of water, results in a film of rubber bonded intimately with soil particles forming the top surface layer. The latex may be applied in amounts that form a substantially continuous film which is either impermeable or porous in nature. A permeable or porous film enhances the germination of seeds or the growth of desired vegetation, yet it effectively inhibits erosion whether caused by wind or rain.

According to this invention the latex composition may be applied directly to the soil to be treated by ordinary spraying equipment, such as garden-type tank sprayers. Storage of the treating material, which is non-flammable, non-toxic, and substantially odorless, in the immediate area to be treated is relatively simple, neat, convenient and durable, requiring nothing more than ordinary containers for liquids such as steel or fiber drums.

Thus, by the present method, undesirable features of prior known soil erosion treatments are eliminated. For example, transportation to and storage at locations where there is a soil erosion problem of large amounts of bulky materials, such as straw and manure, and the use of specialized equipment and/or large numbers of laborers to disperse and properly secure these bulky materials are no longer required. Neither is there the danger of large and costly equipment such as tractors, becoming mired in the freshly graded or filled areas.

The latex composition may contain materials which color the blanket or film of elastomer in either light or dark shades, which will either reflect or absorb the rays of the sun. Thus, the temperature of the soil beneath the film of elastomer can be controlled to some degree to protect seeds and vegetation from extreme temperatures and encourage growth.

The film or blanket of rubber, even if porous, retards loss of moisture from the surface of soil by evaporation and slows the percolation of water soluble nutrients away from the area of seed germination and root growth, The method of this invention is of particular value to agriculture. The latex composition may be employed to coat mounds of earth by which the young trees, such as citrus trees, are protected. This permeable film is intimately bound to the top surface layer of soil to prevent erosion caused by wind or rain.

It is possible that radioactivity in the atmosphere in years to come may increase to the point where seed germination may be greatly retarded or even prevented. By including certain selected pigments of a dense nature, such as oxides of lead, barium, tin, tungsten, silver, osmium, iron and bismuth, and the carbides of tungsten, in the aqueous emulsion of rubber it may be possible to protect plant life from harmful effects of radiation by the resulting colored rubber film.

The term "rubber" as employed in this specification and appended claims means any material, regardless of its chemical composition, that possesses mechanical properties similar to the special properties of natural rubber—high deformability, rapid recovery from deformation, good mechanical strength, and the like. The terms "rubber" and "elastomer" are used interchangeably as generic expressions for all materials having such rubber-like properties; however, "rubber" appears to be the preferred term (see for example Synthetic Rubber by G. S. Whitby, John Wiley & Sons, Inc. 1954, pp. 27–29).

In the present invention, "rubber" as defined above is one of the constituents of the latex compositions used in forming the protective film. Thus, the rubber may comprise natural rubber and synthetic rubber. The synthetic rubber may comprise polymers and copolymers of various dienes. For example, such synthetic rubber may comprise polymers of butadiene-1,3, alkyl substituted butadiene-1,3 such as 2-methyl-, 2,3-dimethyl-, 2-ethyl-, 2-isopropylstyrene, cyano-substituted butadiene-1,3, such as 1-cyano-, and 2-cyanostyrene, and the like.

Copolymers of butadiene monomers with various other monomers may also be employed. For example, butadiene monomers may be copolymerized with such monomers as styrene, and substituted styrenes such a alkyl-, aryl-, halo-, cyano-, hydroxy-, acetoxy-, and carboxystyrene. Typical of the aryl- and mono- and di- substituted alkyl- and arylstyrenes are p-isopropyl-, m-sec-butyl-, p-phenyl-, and p-benzylstyrene. Suitable halostyrenes comprise mono- and polysubstituted fluoro-, chloro-, and bromostyrenes such as monochlorostyrene, 2,3-, 2,5-, and 3,4-dichlorostyrene, and pentachlorostyrene. p-Cyanostyrene is typical of cyanostyrene monomers which may be copolymerized with the butadiene-1,3-monomers. Useful hydroxy and acetoxystyrene monomers include 2,3-hydroxystyrene and 2,3-acetoxystyrene, respectively. p-Carboxystyrene is a substituted styrene monomer which may be employed to form copolymers with butadienes for use according to this invention.

Other monomers which may be copolymerized with butadiene to form useful rubbers for use in this invention include ethers such as ethyl, isopropyl, and p-propyl vinyl ethers; chloro-substituted isopropenylbenzenes such as o-, m-, and p-chloro-, and 2,3-, 2,4-, 3,4-, 3,5-dichloro-isopropenylbenzenes; halo-, and cyanoolefins such as vinylidene chloride and methacrylonitrile, respectively; carbonyl compounds such as methyl isopropenyl ketone; esters such as methyl, ethyl isopropyl and butyl acrylates; vinylpyridines such as 4-vinylpyridine, various other heterocyclic co-monomers such as vinylquinoline, and carboxylic acids such as acrylic and methacrylic acids.

Other suitable rubbers for use in the present invention include rubber-like polymers made by polymerization of a haloprene, such as chloroprene (2-chloro-1,3-butadiene), or by polymerizing a mixture of polymerizable monomers, the major component of which is chloroprene. Various nitrile rubbers, as for example copolymers of butadiene-1,3 with acrylonitrile, may also be used in the method of this invention. Substituted butadiene monomers may be also employed with such materials as acrylonitrile, methacrylonitrile, etc., in the formation of suitable nitrile rubbers. Other vinyl compounds may also be included in the polymerization to impart specific properties to the finished products. Nitrile-modified natural rubber may be also employed. Plasticized polymers and copolymers of vinyl chloride (Geons) which have rubber-like properties may also be used.

Another rubber which is particularly useful in the method of this invention is butyl rubber, which is made by copolymerization of a large portion of olefin with a small portion of diolefin. Typical commercial grade butyl rubber is produced by the copolymerization of isobutylene with small portions of isoprene. Other products of the butyl rubber type which may be employed may be made using butadiene, dimethylbutadiene, or piperidine instead of isoprene in the polymerization.

In addition to the aforementioned materials rubber or rubber-like materials which are suitable for use in this invention include elastothiomers, polyacrylates, polyesters, silicones, and polymers in which a variety of ester, amide, and urethane linkages occur. The last group have been referred to as "diisocyanate-linked condensation elastomers."

Suitable elastothiomer or polysulfide elastomers include those produced by condensation of an aliphatic dihalide, such as ethylene dichloride, with sodium polysulfide. In place of ethylene dichloride various other dihalides such as propylene dichloride, and bis(2-chloroethyl) ether may be used.

Suitable acrylic rubbers or elastomers are those prepared by copolymerizing ethylacrylate with a small amount of a chlorine-containing monomer such as 2-chloroethyl acrylate and vulcanizing the resulting copolymer with sulfur and suitable accelerators.

Suitable silicone rubbers include those formed by polycondensation of silicols (with loss of the elements of water), which in turn are obtained by hydrolysis of chlorosilanes.

Satisfactory polyester rubbers include those prepared from dibasic acids, such as sebacic acid, and glycols, such as ethylene glycol.

Other rubbers which are particularly suitable for use in latex compositions for carrying out the method of this invention are disclosed and claimed in the co-pending applications of Onslow B. Hager and Robert A. Martin, Serial Nos. 696,338 and 696,339, filed November 14, 1957.

In application Serial No. 696,338 there are disclosed certain materials having rubber-like properties which are copolymers of a vinyl ester monomer of the formula:

in which R is hydrogen and an alkyl radical containing from 1 to 4 carbon atoms; an acrylic ester monomer of the formula:

in which X is hydrogen and methyl and Y is an alkyl radical containing from 8 to 20 carbon atoms when X is hydrogen and an alkyl radical containing from 4 to 8 carbon atoms when X is methyl; an acid monomer selected from the group consisting of polymerizable, di-carboxylic, aliphatic acids containing from 4 to 5 carbon atoms and anhydrides thereof, and a modifier monomer which is an ester of acrylic acid and a monohydroxy alcohol containing from 1 to 3 carbon atoms.

A preferred rubber produced according to the invention of that application is a copolymer comprising from about 50 to 70 parts, by weight, of vinyl acetate, about 5 to 10 parts ethylhexyl acrylate, about 2 to 3 parts itaconic acid, and about 20 to 50 parts of ethyl acrylate, and having a molecular weight of from about 100,000 to 600,000.

Application Serial No. 696,339 discloses and claims rubbers similar to those of application Serial No. 696,338 in which a diester of a dibasic acid of the formula:

XOOCH=CHCOOX in which X is an alkyl radical containing from 1 to 8 carbon atoms, is substituted for the acrylic ester monomer.

A preferred rubber of the latter application is a copolymer of about 5 to 70 parts, by weight, of vinyl acetate, about 5 to 10 parts of dibutyl maleate, about 2 to 3 parts of fumaric acid, and about 20 to 50 parts of ethyl acrylate, and having a molecular weight of from about 100,000 to 600,000.

The copolymers of these two applications may be prepared by emulsion polymerization in the presence of peroxide catalysts, such as hydrogen peroxide, and certain anionic emulsifiers and nonionic stabilizers, such as alkylarylsulfonates and fatty alcohol sulfates, respectively Preferably the synthetic rubbers are produced by well known methods of emulsion polymerization to form an aqueous emulsion of rubber solids commonly referred to as a latex. The rubber may be in a cured (cross-linked) or uncured condition. In the case of uncured rubber, cross-linking (curing) can be effected by inclusion in the latex composition to be applied to the soil of a combination of sulfur, zinc oxide and salts of dithiocarbamic acid, or other curing agents well known in the rubber industry, which cause curing of the rubber in the presence of air and/or sunlight.

In addition to rubber, the latex compositions employed in the method of this invention contain a water-soluble "counter-penetrant" which functions to inhibit soil penetration by the rubber particles, whereby the rubber particles form a surface film which is bonded to the top surface layer of soil particles. These counter-penetrants which exhibit a minimum of surface tension depressing activity, apparently are adsorbed preferentially by the soil particles, rendering the latex composition unstable, which results in rapid coalescence of the rubber particles into a surface film. The counter-penetrants employed also exhibit protective colloid action for the colloidal rubber particles to render the latex compositions stable prior to use, even though the compositions are stored for considerable periods of time, and during application when subjected to mechanical shear of pumping and spraying. Also, due to the protective colloid action of the counter-penetrant water dilution of a latex composition of high rubber content to concentrations suitable for carrying out the method of this invention does not render the latex compositions unstable.

Counter-penetrants suitable for use in the latex compositions include natural gums, methyl cellulose, hydroxyethyl cellulose, polyacrylates, and polyacrylamides.

The natural gums which are suitable for the purposes of this invention are carbohydrates of complex structures which are formed as decomposition products of various plants. Those which are soluble in water may be used as such, whereas those which are water-insoluble are suitable after being rendered water-soluble. Those natural gums which are water-soluble include karaya, tragacanth, arabic and locust bean gum. Natural gums which are ordinarily water-insoluble but suitable for use in the present invention when rendered water-soluble include casein and alginic acid. Water-soluble forms of casein are ammonium caseinate, alkali metal caseinates, such as sodium caseinate, and borated casein. A water-soluble form of alginic acid suitable for use is ammonium alginate. Therefore, the term "natural gum" as used in this specification and claims means natural gums which are ordinarily water-soluble and those which can be converted into a water-soluble form.

Methyl cellulose for use in the latex compositions of the method of this invention preferably have a degree of substitution of from about 1.2 to about 2 with methyl groups. In addition to methyl groups there may be substitution of all or a portion of remaining hydroxy groups which have not been converted to methoxy groups, by groups such as hydroxypropyl groups, which do not adversely affect protective colloid activity and the property of preferential adsorption by soil particles required of the counter-penetrant. The degree of substitution, therefore, refers to methyl groups only.

With regard to the meaning of the expression "degree of substitution," each anhydroglucose unit in a cellulose molecule contains three reactive hydroxyl groups, and theoretically complete reaction would mean the introduction of three methyl or other groups per anhydroglucose unit. Such a completely reacted product would have "a degree of substitution of 3." Degree of substitution thus may vary from zero to 3.

Other cellulose derivatives suitable for use as counter-penetrants in this invention comprise hydroxyethyl ethers of cellulose having a degree of substitution of from about 1.5 to about 3, and salts of carboxy methyl cellulose, such as sodium carboxy methyl cellulose, having a degree of substitution of from about 0.4 to about 1.3, and preferably about 0.7.

Water-soluble polyacrylates suitable as counterpenetrants comprise acrylic polymers, such as alkali metal polyacrylates, e.g., sodium polyacrylate, and polyacrylamides. The alkali metal polyacrylates preferable have a molecular weight such that an 0.5 percent aqueous solution thereof has a viscosity of from about 20 to about 200 cps. at 38° C. (Brookfield Viscometer, Spindle No. 3).

Mixtures of the above-described counter-penetrants may be employed in the latex compositions as well as any one thereof.

Suitable latex compositions for carrying out the method of this invention may comprise from about 0.5 to about 10 percent, by weight, rubber solids, and preferably from about 2 to about 4 percent. The amount of counter-penetrant present in the latex compositions may vary from about 0.005 to about 0.5 percent, and preferably from about 0.05 to about 0.15 percent is employed The strength and other physical properties of the film, also the permanence of these to weathering, can be controlled by chemically regulating the degree of curing, cross-linking, extension, and modification—through the use of anti-degradants, vulcanizing agents and accelerators for vulcanization. Such well known extenders as the clays, whitings, etc. may also be present in the latex compositions. Anti-degradants fall into two general classes, i.e.: The staining type derived from aryl amines and the non-staining type derived from alkylated phenols. Both types find use for this where long life of the film is required.

As stated previously, it may be desirable to include certain pigments in the latex composition to provide a colored rubber film which either reflects or absorbs the rays of the sun. Carbon black is particularly suitable for the purpose of providing a film which absorbs the sun's rays thereby increasing the temperatures of the soil beneath the film to aid in seed germination.

A preferred manner for carrying out the method of this invention is by spraying the latex compositions onto the soil to be treated. The type of sprayer used is not important as long as it is capable of applying an even coating with relative ease of control. The familiar tank-type knapsack garden sprayer is very efficient for application in small areas. Large mobile sprayers and aircraft may be used in treatment of areas of considerable size.

The air-dried rubber forms a film on the surface of the soil which is intimately bound with the top surface layer of soil particles. The nature of the rubber film, as regards porosity, will depend on the amount of latex composition applied to the soil and upon the particle size distribution of the top surface layer of soil. If it is desired to form a substantially impermeable film on the soil surface, the rate of application must be substantially greater than that necessary to provide a porous film for a given type of soil. A greater rate of application is required to form either a continuous porous or non-porous film where the soil surface layer comprises very coarse particles. Rate of application can be varied by changing the rubber solids content of the latex composition and/or means of application.

Generally, from about 0.25 to 5 ounces of rubber (dry basis) per square yard will be sufficient to produce a continuous film in most applications. If a substantially impermeable film is desired, application at a rate in the higher portion of this range, or even greater, may be employed. In the case where a porous film is called for, application at a rate of about 1 to about 2 ounces of rubber solids per square yard will generally be sufficient. As long as the film in the area treated is substantially continuous, whether porous or non-porous, stilling of the soil to prevent erosion will be effected. Porous films are generally desired where seed germination and new growth are desired. Where the film of rubber is to act as a mulch to prevent growth of weeds, it is preferably substantially impermeable or non-porous.

The following examples are illustrative of the method of this invention:

*Example I*

An aqueous emulsion having the following composition was sprayed by means of a tank-type garden sprayer on the surface of fine sandy silt dredged from a river bottom and formed into a dry land area of several acres which had been fertilized, seeded with rye grass seed, and lightly raked to cover the seeds with soil:

| Constituent: | Weight percent |
|---|---|
| Butadiene-styrene copolymer [1] | 3.67 |
| Sodium polyacrylate [2] | 0.015 |
| Carbon black | 0.128 |
| Water | 96.097 |

[1] Using latex described in A.S.T.M. D-1420-58-T (SBR-2000).
[2] Counter-penetrant (Vis. 20 cps. at 38° C. for 0.5% aqueous solu.).

The area treated hitherto had presented a severe erosion problem due to wind. The emulsion was applied in an amount to provide one ounce of butadiene-styrene copolymer per square yard.

An examination of the treated soil surface after evaporation of water disclosed a porous surface film of butadiene-styrene copolymer bonded intimately with surface soil particles. Periodic observation of the treated areas revealed that no erosion had taken place in a period of two months and that the sprouts of rye grass grew readily through the porous film.

*Example II*

Example I was repeated, the rate of application being 2 ounces of elastomer per square yard. The results obtained were substantially the same as those described in Example I.

*Example III*

The latex composition described below was sprayed by means of a tank-type garden sprayer on the surface of fine sandy silt dredged from a river bottom and formed into a dry land area of several acres which had been fertilized, seeded with rye grass seed, and lightly raked to cover the seeds with soil.

| Constituent: | Weight percent |
|---|---|
| Butadiene-styrene copolymer [1] | 2.4 |
| Sodium polyacrylate [2] | 0.008 |
| Carbon black | 0.082 |
| Clay | 1.43 |
| Water | 96.08 |

[1] Using latex described in A.S.T.M. D-1420-58-T (SBR-2000).
[2] Counter-penetrant (Vis. 200 cps. at 38° C. for 0.5% aqueous solu.).

The area treated had hitherto presented a severe erosion problem due to wind. The latex composition was applied in an amount to provide one ounce of butadiene-styrene copolymer per square yard.

An examination of the treated soil surface after evaporation of water disclosed a porous surface film of butadiene-styrene copolymer bonded intimately with surface soil particles. Periodic observation of the treated areas revealed that no erosion had taken place in a period of two months and that the sprouts of rye grass grew readily through the porous film.

*Example IV*

Example III was repeated, the rate of application of elastomer being 2 ounces per square yard. The results obtained were substantially the same as those described in Example III.

*Example V*

The results of Example III are obtained by the procedure of Example III with a latex composition in which butadiene-acrylonitrile copolymer is substituted for butadiene-styrene copolymer.

*Example VI*

The below described latex composition is sprayed by means of a tank-type garden sprayer on the surface of fine sandy silt:

| Constituent: | Weight percent |
|---|---|
| Natural rubber polymer | 3.31 |
| Sodium polyacrylate [1] | 0.033 |
| Carbon black | 0.141 |
| Antidegradant | 0.413 |
| Water | 96.103 |

[1] Counter-penetrant (Vis. 200 cps. at 38° C. for 0.5% aqueous solu.).

The latex composition is applied in an amount to provide from about 1.5 ounces of natural rubber per square yard.

An examination of the treated soil surface after evaporation of water discloses a porous surface film of natural rubber bonded intimately with surface soil particles.

*Example VII*

Example VI may be repeated employing the following composition applied at a rate of 3 ounces per square yard:

| Constituent: | Weight percent |
|---|---|
| Chloroprene polymer | 3.6 |
| Ammonium caseinate [1] | 0.129 |
| Carbon black | 0.103 |
| Wetting agent | 0.643 |
| Water | 95.525 |

[1] Counter-penetrant.

*Example VIII*

Example VI may be repeated employing the following composition applied at a rate of 2 ounces per square yard:

| Constituent: | Weight percent |
|---|---|
| Butyl rubber polymer | 2.51 |
| Methyl cellulose [1] | 0.075 |
| Clay | 1.253 |
| Wetting agent | 0.063 |
| Water | 96.1 |

[1] Counter-penetrant (degree of substitution 1.2–2).

*Example IX*

Sandy Florida soil was mounded around the base of young fruit trees to cover the graft bud, and the mounded soil was sprayed with the following latex composition:

| Constituent: | Weight percent |
|---|---|
| Butadiene-styrene copolymer [1] | 3.8 |
| Potassium oleate | 0.019 |
| Carbon black | 0.051 |
| Sodium polyacrylate [2] | 0.028 |
| Antioxidant | 0.008 |
| Water | 96.094 |

[1] Using latex described in A.S.T.M. D-1420-58-T (SBR-2000).
[2] Counter-penetrant (Vis. 200 cps. at 38° C. for 0.5% aqueous soln.).

An examination of the treated soil surface after evaporation of water disclosed a porous surface film of the rubber intimately bound with the top surface layer of soil particles. Periodic examinations of the treated soil mounds were made and revealed that no erosion had taken place, and that the mounds were in as good condition as at the time the soil was freshly mounded.

*Example X*

Sandy Florida soil was mounded around the base of young fruit trees to cover the graft bud, and the mounded soil was sprayed with the following latex composition:

| Constituent: | Weight percent |
|---|---|
| Butadiene-styrene copolymer [1] | 3.39 |
| Potassium oleate | 0.017 |
| Methyl cellulose [2] | 0.078 |
| Carbon black | 0.045 |
| Zinc oxide-sulfur | 0.328 |
| Zinc dimethyl dithiocarbamate | 0.039 |
| Water | 96.103 |

[1] Using latex described in A.S.T.M. D-1420-58-T (SBR-2000).
[2] Counter-penetrant (degree of substitution 1.2-2).

An examination of the treated soil surface after evaporation of water disclosed a porous surface film of the elastomer intimately bound with the top surface layer of soil particles. Periodic examinations of the treated soil mounds were made and revealed that no erosion had taken place, and that the mounds were in as good condition as at the time the soil was freshly mounded.

*Example XI*

Sandy Florida soil was mounded around the base of young fruit trees to cover the graft bud, and the mounded soil was sprayed with the following latex composition:

| Constituent: | Weight percent |
|---|---|
| Chloroprene polymer | 3.78 |
| Potassium oleate | 0.05 |
| Carbon black | 0.134 |
| Sodium polyacrylate [1] | 0.02 |
| Water | 96.016 |

[1] Counter-penetrant (Vis. 100 cps. at 38° C. for 0.5% aqueous soln.).

An examination of the treated soil surface after evaporation of water disclosed a porous surface film of the elastomer intimately bound with the top surface layer of soil particles. Periodic examinations of the treated soil mounds were made and revealed that no erosion had taken place, and that the mounds were in as good condition as at the time the soil was freshly mounded.

*Example XII*

Sandy Florida soil was mounded around the base of young fruit trees to cover the graft bud, and the mounded soil was sprayed with the following latex composition:

| Constituent: | Weight percent |
|---|---|
| Butadiene-acrylonitrile copolymer | 3.803 |
| Potassium oleate | 0.019 |
| Carbon black | 0.051 |
| Sodium polyacrylate [1] | 0.028 |
| Water | 96.099 |

[1] Counter-penetrant (Vis. 100 cps. at 38° C. for 0.5% aqueous soln.).

An examination of the treated soil surface after evaporation of water disclosed a porous surface film of the elastomer intimately bound with the top surface layer of soil particles. Periodic examinations of the treated soil mounds were made and revealed that no erosion had taken place, and that the mounds were in as good condition as at the time the soil was freshly mounded.

*Example XIII*

The results of Example IX are obtained by the procedure of Example IX with a latex composition in which sodium carboxymethyl cellulose having a degree of substitution of 0.4–1.3 is substituted for sodium polyacrylate.

*Example XIV*

The results of Example X are obtained by the procedure of the example employing a latex composition in which a hydroxyethyl ether of cellulose having a degree of substitution of 1.5–3 is substituted for methyl cellulose.

*Example XV*

The results of Example X are obtained following the procedure of that example with a latex composition comprising:

| Constituent: | Weight percent |
|---|---|
| Butadiene-styrene copolymer [1] | 2.030 |
| Sodium polyacrylate [2] | .011 |
| Carbon black | .027 |
| Clay | 2.030 |
| Sodium polyacrylate [3] | .050 |
| Water | 95.882 |

[1] Described in A.S.T.M. D-1420-58-T (SBR-2000).
[2] Counter-penetrant (Vis. 20 cps. at 38° C. for 0.5% aqueous solu.).
[3] Counter-penetrant (Vis. 200 cps. at 38° C. for 0.5% aqueous solu.).

*Example XVI*

The results of Example X are obtained following the procedure of that example with a latex composition comprising:

| Constituent: | Weight percent |
|---|---|
| Synthetic rubber copolymer | 2.68 |
| Sodium polyacrylate [1] | 0.0013 |
| Sodium polyacrylate [2] | 0.0538 |
| Vinsol resin [3] | 1.340 |
| Carbon black | 0.0358 |
| Water | 95.8891 |

[1] Counter-penetrant (Vis. 20 cps. at 38° C. for 0.5% aqueous solu.).
[2] Counter-penetrant (Vis. 200 cps. at 38° C. for 0.5% aqueous solu.).
[3] Emulsion derived from southern pine wood comprising a complex mixture of chemical components including rosin acids and oxidized rosin acids, neutral high molecular weight compounds, and acidic phenolic materials in the form of substituted phenolic ethers; polyphenols and other high molecular weight phenols.

The synthetic rubber copolymer of the above latex composition was prepared in the following manner.

A mixture of 190 g. of ethyl acrylate, 190 g. of vinyl acetate and 20 g. of dibutyl maleate is added dropwise with stirring over a period of three hours and 39 minutes to 600 g. of demineralized water maintained at a temperature of from 73° to 76° C. containing dissolved therein 10 g. of fumaric acid, 2 g. potassium persulfate, as catalyst, 5.6 g. of sodium ditertiarybutylphenyldiethyleneglycol sulfate. The demineralized water also contains 2.5 g. of polyoxyethylated oleyl alcohol containing about 30 ethylene oxide groups to stabilize the emulsion. During addition of the monomer mixture the concentration of those monomers forming the mixture, i.e. the concentration of the three monomers considered together, is held below about 3 percent and generally in the range between about 0.5 and 1 percent. After complete addition of the monomer mixture, reaction conditions are maintained for one additional hour. The yield of copolymer is 94% of theoretical.

Example XVII

The results of Example X are obtained following the procedure of that example with a latex composition comprising:

| Constituent: | Weight percent |
|---|---|
| Synthetic rubber copolymer | 1.96 |
| Sodium polyacrylate [1] | 0.001 |
| Carbon black | 0.026 |
| Clay | 1.96 |
| Sodium polyacrylate [2] | 0.05 |
| Water | 95.903 |

[1] Counter-penetrant (Vis. 20 cps. at 38° C. for 0.5% aqueous solu.).
[2] Counter-penetrant (Vis. 200 cps. at 38° C. for 0.5% aqueous solu.).

The synthetic rubber copolymer in the latex composition was prepared in the following manner.

A mixture of 190 g. of ethyl acrylate, 190 g. of vinyl acetate and 20 g. of dibutyl maleate is added, dropwise, with stirring, over a period of two hours and 10 minutes to 600 g. of water at 71°–75° C. containing dissolved therein 10 g. of itaconic acid, 2.5 g. of potassium persulfate, 11.2 g. of sodium ditertiarybutylphenyldiethyleneglycol sulfate and 2.5 g. of polyoxyethylated oleyl alcohol containing about 30 ethylene oxide groups. After the addition of the monomer mixture is complete, reaction conditions are maintained for about one additional hour. A 91% yield of copolymer is thereby obtained.

Example XVIII

The results of Example X are obtained following the procedure of that example with a latex composition comprising:

| Constituent: | Weight percent |
|---|---|
| Butadiene-styrene copolymer [1] | 4.120 |
| Sodium polyacrylate [2] | .002 |
| Carbon black | .054 |
| Carboxymethyl cellulose [3] | .008 |
| Water | 95.816 |

[1] Described in A.S.T.M. D–1420–58–T (SBR–2000).
[2] Counter-penetrant (Vis. 20 cps. at 38° C. for 0.5% aqueous solu.).
[3] Counter-penetrant (degree of substitution 0.4 to about 1.3).

The results of Example X are obtained following the procedure of that example with a latex composition comprising:

| Constituent: | Weight percent |
|---|---|
| Butadiene-styrene copolymer [1] | 2.550 |
| Sodium polyacrylate [2] | .013 |
| Carbon black | .335 |
| Ammonium alginate [3] | .126 |
| Water | 96.976 |

[1] Described in A.S.T.M. D–1420–58–T (SBR–2000).
[2] Counter-penetrant (Vis. 20 cps. at 38° C. for 0.5% aqueous solu.).
[3] Counter-penetrant.

Example XX

The procedure of Example X is repeated with the following latex composition:

| Constituent: | Weight percent |
|---|---|
| Polysulfide polymer [1] | 3.9700 |
| Sodium polyacrylate [2] | .0198 |
| Carbon black | .0525 |
| Sodium polyacrylate [3] | .0590 |
| Water | 96.2987 |

[1] Thiokol Disp. WD–6 50%.
[2] Counter-penetrant (Vis. 20 cps. at 38° C. for 0.5% aqueous solu.).
[3] Counter-penetrant (Vis. 200 cps. at 38° C. for 0.5% aqueous solu.).

Example XXI

The procedure of Example X is repeated with the following latex composition:

| Constituent: | Weight percent |
|---|---|
| Butadiene-styrene copolymer [1] | 4.080 |
| Sodium polyacrylate [2] | .002 |
| Carbon black | .054 |
| Karaya gum [3] | .018 |
| Water | 95.846 |

[1] Described in A.S.T.M. D–1420–58–T (SBR–2000).
[2] Counter-penetrant (Vis. 20 cps. at 38° C. for 0.5% aqueous solu.).
[3] Counter-penetrant.

Example XXII

The procedure of Example X is repeated with the following latex composition:

| Constituent: | Weight percent |
|---|---|
| Butadiene-styrene copolymer [1] | 4.2000 |
| Sodium polyacrylate [2] | .0025 |
| Carbon black | .0532 |
| Polyacrylamide [3] | .0310 |
| Water | 95.7133 |

[1] Described in A.S.T.M. D–1420–58–T (SBR–2000).
[2] Counter-penetrant (Vis. 20 cps. at 38° C. for 0.5% aqueous solu.).
[3] Counter-penetrant.

Example XXIII

The procedure of Example X is repeated using the following latex composition:

| Constituent: | Weight percent |
|---|---|
| Synthetic rubber copolymer | 2.0000 |
| Sodium polyacrylate [1] | .0010 |
| Carbon black | .0266 |
| Vinsol resin [2] | 2.0000 |
| Sodium polyacrylate [3] | .0500 |
| Water | 95.9234 |

[1] Counter-penetrant (Vis. 20 cps. at 38° C. for 0.5% aqueous solu.).
[2] Emulsion derived from southern pine wood comprising a complex mixture of various chemical components. These constituents include acidic materials derived from rosin acids and oxidized rosin acids, neutral high molecular weight compounds, and acidic phenolic materials in the form of substituted phenolic ethers, polyphenols and other high molecular weight phenols.
[3] Counter-penetrant (Vis. 200 cps. at 38° C. for 0.5% aqueous solu.).

The synthetic rubber copolymer in the above latex composition was prepared in the following manner.

A mixture of 190 g. of ethyl acrylate, 190 g. of vinyl acetate and 20 g. of ethylhexyl acrylate is added, dropwise, with stirring, over a period of three hours and 31 minutes to 600 g. of water at 70°–75° C. containing dissolved therein 10 g. of itaconic acid, 2 g. of potassium persulfate, 5.6 g. of sodium ditertiarybutylphenyldiethyleneglycol sulfate and 2.5 g. of polyoxyethylated oleyl alcohol containing about 30 ethylene oxide groups. After the addition of the monomer mixture is complete, reaction conditions are maintained for about one additional hour. A 96% yield of copolymer is thereby obtained.

Although the present invention has been described with reference to specific details of certain embodiments thereof, it is not intended that such details shall be regarded as limitations upon the scope of the invention except insofar as included in the accompanying claims.

What is claimed is:

1. The method of treating soil to prevent erosion which comprises applying to the soil surface a latex composition comprising from about 0.5 to about 10 percent, by weight, of a water-insoluble rubber and from about 0.005 to about 0.5 percent of a water soluble counter-penetrant for said rubber which is selectively adsorbed by soil particles to render the latex composition unstable and which has protective colloid action for the colloidal particles of rubber in said latex composition selected from the group consisting of natural gum, methyl cellulose having a degree of substitution of from about 1.2 to about 2, a hydroxyethyl ether of cellulose having a degree of substitution of from about 1.5 to about 3, alkali metal salts of carboxy methyl cellulose having a degree of substitution of from about 0.4 to about 1.3, alkali metal polyacrylates, an 0.5 percent solution of which has a viscosity of from about 20 to about 200 cps. at 30° C., and polyacrylamide, said latex composition being applied in an amount between about 0.25 and about 5 ounces of rubber per square yard, thereby providing a substantially continuous film of rubber intimately bound to surface soil particles through which vegetation may grow.

2. The method according to claim 1 in which said rubber comprises a copolymer of butadiene and styrene.

3. The method according to claim 1 in which said rubber comprises natural rubber.

4. The method according to claim 1 in which said rubber comprises chloroprene.

5. The method according to claim 1 in which said latex composition is applied in an amount providing between about 1 and about 2 ounces of rubber per square yard.

6. The method according to claim 1 in which said latex composition includes a pigment which absorbs radiant heat.

7. The method according to claim 6 in which said pigment comprises carbon black.

8. The method of treating soil to prevent erosion which comprises applying to the soil surface a latex composition comprising from about 2 to about 4 percent, by weight, of a water-insoluble rubber and from about 0.05 to about 0.15 percent of a water-soluble counter-penetrant for said rubber which is selectively adsorbed by soil particles to render the latex composition unstable and which has protective colloid action for the colloidal particles of rubber in said latex composition selected from the group consisting of natural gum, methyl cellulose having a degree of substitution of from about 1.2 to about 2, a hydroxyethyl ether of cellulose having a degree of substitution of from about 1.5 to about 3, alkali metal salts of carboxy methyl cellulose having a degree of substitution of from about 0.4 to about 1.3, alkali metal polyacrylates, an 0.5 percent solution of which has a viscosity of from about 20 to about 200 cps. at 38° C., and polyacrylamide, said latex composition being applied in an amount between about 0.25 and about 5 ounces of rubber per square yard, thereby providing a substantially continuous film of rubber intimately bound to surface soil particles through which vegetation may grow.

9. The method according to claim 8 in which said rubber comprises a copolymer of butadiene and styrene.

10. The method according to claim 8 in which said rubber comprises natural rubber.

11. The method according to claim 8 in which said rubber comprises chloroprene.

12. The method according to claim 8 in which said latex composition is applied in an amount providing between about 1 and about 2 ounces of rubber per square yard.

13. The method according to claim 8 in which said latex composition includes a pigment which absorbs radiant heat.

14. The method according to claim 13 in which said pigment comprises carbon black.

15. The method of treating seeded soil to enhance germination of seeds which comprises applying to the soil surface a latex composition comprising from about 0.5 to about 10 percent, by weight, of a water-insoluble rubber and from about 0.005 to about 0.5 percent of a water soluble counter-penetrant for said rubber which is selectively adsorbed by soil particles to render the latex composition unstable and which has protective colloid action for the colloidal particles of rubber in said latex composition selected from the group consisting of natural gum, methyl cellulose having a degree of substitution of from about 1.2 to about 2, a hydroxyethyl ether of cellulose having a degree of substitution of from about 1.5 to about 3, alkali metal salts of carboxy methyl cellulose having a degree of substitution of from about 0.4 to about 1.3, alkali metal polyacrylates, an 0.5 percent solution of which has a viscosity of from about 20 to about 200 cps. at 30° C., and polyacrylamide, said latex composition being applied in an amount between about 0.25 and about 5 ounces of rubber per square yard, thereby providing a substantially continuous, porous film of rubber intimately bound to surface soil particles through which new growth from germinating seeds may pass.

16. The method of treating soil to prevent erosion which comprises applying to the soil surface a latex composition comprising from about 0.5 to about 10 percent, by weight, of a copolymer comprising from 50 to about 70 parts, by weight, of vinyl acetate, from about 5 to about 10 parts ethylhexyl acrylate, from about 2 to about 3 parts itaconic acid, and from about 20 to about 50 parts of ethyl acrylate, and having a molecular weight of from about 100,000 to about 600,000, and from about 0.005 to about 0.5 percent of a water soluble counter-penetrant for said copolymer which is selectively adsorbed by soil particles to render the latex composition unstable and which has protective colloid action for the colloidal particles of copolymer in said latex composition selected from the group consisting of natural gum, methyl cellulose having a degree of substitution of from about 1.2 to about 2, a hydroxyethyl ether of cellulose having a degree of substitution of from about 1.5 to about 3, alkali metal salts of carboxy methyl cellulose having a degree of substitution of about 0.4 to about 1.3, alkali metal polyacrylates, a 0.5 percent solution of which has a viscosity of from about 20 to about 200 cps. at 30° C., and polyacrylamide, said latex composition being applied in an amount between about 0.25 and about 5 ounces of said copolymer per square yard, thereby providing a substantially continuous film of said copolymer intimately bound to surface soil particles through which vegetation may grow.

17. The method of treating soil to prevent erosion which comprises applying to the soil surface a latex composition comprising from about 0.5 to about 10 percent, by weight, of a copolymer comprising from about 50 to about 70 parts, by weight, of vinyl acetate, from about 5 to about 10 parts dibutyl maleate, about 2 to about 3 parts of fumaric acid, and from about 20 to about 50 parts of ethyl acrylate, and having a molecular weight of from about 100,000 to about 600,00, and from about 0.005 to about 0.5 percent of a water soluble counter-penetrant for said copolymer which is selectively absorbed by soil particles to render the latex composition unstable and which has protective colloid action for the colloidal particles of copolymer in said latex composition selected from the group consisting of natural gum, methyl cellulose having a degree of substitution of from about 1.2 to about 2, a hydroxyethyl ether of cellulose having a degree of substitution of from about 1.5 to about 3, alkali metal salts of carboxy methyl cellulose having a degree of substitution of about 0.4 to about 1.3, alkali metal polyacrylates, a 0.5 percent solution of which has a viscosity of from about 20 to about 200 cps. at 30° C., and polyacrylamide, said latex composition being applied in an amount between about 0.25 and about 5 ounces of said copolymer per square yard, thereby providing a substantially continuous film of said copolymer intimately bound to surface soil particles through which vegetation may grow.

18. The method of treating soil to prevent erosion which comprises applying to the soil surface a latex composition comprising from about 0.5 to about 10 percent, by weight, of copolymer of butadiene and styrene, and from about 0.005 to about 0.5 percent of a counter-penetrant for said copolymer comprising sodium polyacrylate, said latex composition being applied in an amount between 0.25 and about 5 ounces of said copolymer per square yard, thereby providing a substantially continuous film of said copolymer intimately bound to surface soil particles through which vegetation may grow.

19. The method of treating soil to prevent erosion which comprises applying to the soil surface a latex composition comprising from about 2 to about 4 percent, by weight, of a copolymer comprising from about 50 to about 70 parts, by weight, of vinyl acetate, from about 5 to about 10 parts ethylhexyl acrylate, from about 2 to about 3 parts itaconic acid, and from about 20 to about 50 parts of ethyl acrylate, and having a molecular weight of from about 100,000 to about 600,000, and from about 0.05 to about 0.15 percent of a water-soluble counter-penetrant for said copolymer which is selectively adsorbed by soil particles to render the latex composition unstable and which has protective colloid action for the colloidal particles of copolymer in said latex composition selected from the group consisting of natural gum, methyl cellulose having a degree of substitution of from about 1.2 to about 2, a hydroxyethyl ether of cellulose having a degree of substitution from about 1.5 to about 3, alkali metal salts of carboxymethyl cellulose having a degree of substitution of from about 0.4 to about 1.3 alkali metal polyacrylates, a 0.5 percent solution of which has a viscosity of from about 20 to about 200 cps. at 38° C., and polyacrylamide, said latex composition being applied in an amount between about 0.25 and about 5 ounces of said copolymer per square yard, thereby providing a substantially continuous film of said copolymer intimately bound to surface soil particles through which vegetation may grow.

20. The method of treating soil to prevent erosion which comprises applying to the soil surface a latex composition comprising from about 2 to about 4 percent, by weight, of a copolymer comprisig from about 50 to about 70 parts, by weight of vinyl acetate, from about 5 to about 10 parts of dibutyl maleate, about 2 to about 3 parts of fumaric acid, and from about 20 to about 50 parts of ethyl acrylate, and having a molecular weight of from about 100,000 to about 600,000, and from about 0.05 to about 0.15 percent of a water-soluble counter-penetrant for said copolymer which is selectively adsorbed by soil particles to render the latex composition unstable and which has protective colloid action for the colloidal particles of copolymer in said latex composition selected from the group consisting of natural gum, methyl cellulose having a degree of substitution of from about 1.2 to about 2, a hydroxyethyl ether of cellulose having a degree of substitution of from about 1.5 to about 3, alkali metal salts of carboxymethyl cellulose having a degree of substitution of from about 0.4 to about 1.3, alkali metal polyacrylates, a 0.5 percent solution of which has a viscosity of from about 20 to about 200 cps. at 38° C., and polyacrylamide, said latex composition being applied in an amount between about 0.25 and about 5 ounces of said copolymer per square yard, thereby providing a substantially continuous film of said copolymer intimately bound to surface soil particles through which vegetation may grow.

21. The method of treating soil to prevent erosion which comprises applying to the soil surface a latex composition comprising from about 2 to about 4 percent, by weight, of a copolymer of butadiene and styrene, and from about 0.05 to about 0.15 percent of a counter-penetrant for said copolymer comprising sodium polyacrylate, said latex composition being applied in an amount between about 0.25 and about 5 ounces of said copolymer per square yard, thereby providing a substantially continuous film of said copolymer intimately bound to surface soil particles through which vegetation may grow.

22. The method of treating seeded soil to enhance germination of seeds which comprises applying to the soil surface a latex composition comprising from about 0.5 to about 10 percent by weight of a copolymer of butadiene and styrene and from about 0.005 to about 0.5 percent of a counter-penetrant for said copolymer comprising sodium polyacrylate, said latex composition being applied in an amount between about 0.25 and about 5 ounces of said copolymer per square yard, thereby providing a substantially continuous film of said copolymer intimately bound to surface soil particles through which vegetation may grow.

23. The method of treating seeded soil to enhance seed germination which comprises applying to the soil surface a latex composition comprising from about 0.5 to about 10 percent, by weight, of a copolymer comprising from about 50 to about 70 parts, by weight, of vinyl acetate, from about 5 to about 10 parts ethylhexyl acrylate, from about 2 to about 3 parts itaconic acid, and from about 20 to about 50 parts of ethyl acrylate, and having a molecular weight of from about 100,000 to about 600,000, and from about 0.005 to about 0.5 percent of a water soluble counter-penetrant for said copolymer which is selectively adsorbed by soil particles to render the latex composition unstable and which has protective colloid action for the colloidal particles of rubber in said latex composition selected from the group consisting of natural gum, methyl cellulose having a degree of substitution of from about 1.2 to about 2, a hydroxyethyl ether of cellulose having a degree of substitution of from about 1.5 to about 3, alkali metal salts of carboxymethyl cellulose having a degree of from 0.4 to about 1.3, alkali metal polyacrylates, a 0.5 percent so'ution of which has a viscosity of from about 20 to about 200 cps. at 38° C., and polyacrylamide, said latex composition being applied in an amount between 0.25 and about 5 ounces of said copolymer per square yard, thereby providing a substantially continuous film of said copolymer intimately bound to surface soil particles through which vegetation may grow.

24. The method according to claim 1 in which said rubber comprises a copolymer of butadiene and acrylonitrile.

25. The method according to claim 1 in which said rubber comprises butyl rubber.

References Cited in the file of this patent

UNITED STATES PATENTS

| | | |
|---|---|---|
| 1,882,377 | Whittelsey | Oct. 11, 1932 |
| 2,203,274 | Anderson | June 4, 1940 |
| 2,847,392 | Eck | Aug. 12, 1958 |

OTHER REFERENCES

Publication, Lentz: "How to Grow Grass on Roadsides," published April 1949 in Public Works (Magazine) volume 80, Number 4, pages 30, 31, 32.

UNITED STATES PATENT OFFICE

CERTIFICATION OF CORRECTION

Patent No. 2,961,799                          November 29, 1960

Bernard Coe

It is hereby certified that error appears in the above numbered patent requiring correction and that the said Letters Patent should read as corrected below.

Column 3, line 41, for "a" read -- as --; line 58, for "p-propyl" read -- n-propyl --; column 5, line 8, for "5" read -- 50 --; column 14, line 53, for "600,00," read -- 600,000, --.

Signed and sealed this 9th day of May 1961.

(SEAL)
Attest:

ERNEST W. SWIDER                              DAVID L. LADD
Attesting Officer                                 Commissioner of Patents